United States Patent Office 3,842,001
Patented Oct. 15, 1974

3,842,001
METHOD FOR EXTRACTING RETAINED OIL AND SOLIDS FROM A FILTER MEDIA AND SEPARATING THE SAME
Howard F. Keller, Jr., Fullerton, Calif., assignor to GBK Enterprises, Inc., Placentia, Calif.
No Drawing. Filed Mar. 21, 1973, Ser. No. 343,285
Int. Cl. B01d 23/24
U.S. Cl 210—23          12 Claims

ABSTRACT OF THE DISCLOSURE

A filter media containing oil and particulate solids from the filtration of oil-water-solids fluid dispersions is agitated in the presence of a water solution of nonionic surfactant for the oil to displace oil from the filter media and form an oil/water emulsion. Agitation is carried out at a temperature below the cloud point of the surfactant. Following agitation, the filter media is backwashed with water to obtain a backwashing composition containing the emulsion and particulate solids. Thereafter, the backwashing composition is heated to a temperature above the cloud point of the surfactant whereby the backwashing composition is resolved into (a) a fluid layer containing solids-free oil, (b) a fluid layer containing useable water and (c) a fluid layer containing oil-free solids.

BACKGROUND OF THE INVENTION

This invention relates to the filtration method for resolving fluid dispersions containing oil, water and particulate solids. More particularly, it relates to an aqueous emulsion method for extracting and removing retained oil and particulate solids from the filter media and to the thermal treatment of the resulting extraction to obain solids-free oil, oil-free solids and useable water.

The term "oil" as used herein refers to hydrocarbon oils and oxyhydrocarbon oils.

In petroleum processing, vegetable oil processing, steel processing and the like, fluid dispersions containing oil, water and particulate solids are encountered from which the oil and solids must be substantially completely removed so that the water can be reused or discarded without causing pollution.

It has been common practice in the petroleum industry to resolve fluid systems containing water, oil and particulate solids by first removing oil through gravity settling and decantation. The water-oily solids residue is then reprocessed by flocculation and sedimentation, or by air flotation with or without flocculation, to separate the oily solids from clarified water which is decanted. The oily solids, in the form of an oily floc, are usually thickened, separated by filtration and incinerated or buried in a land fill. Typically, the oily solids are oil-wet, finely divided earth residues and/or precipitates such as calcium carbonate, calcium sulfate, or iron sulfide which resist agglomeration and, because they have a specific gravity close to water, do not tend to rise with the oil during the gravity settling step or settle from the water.

In the processing of vegetable sources to obtain edible oils, the waste water from the various processing steps is pumped to a gravity separation station. This waste water contains hexane extractable, oxyhydrocarbon fatty constituents such as fatty acids, fats, fatty oils, fatty monoglycerides, fatty diglycerides and fatty triglycerides in both dispersed and non-dispersed forms. A dispersion of fatty constituents can be formed in the conduit to the separation station when fatty acids combine, under appropriate conditions of concentration and turbulence, to form micelles which act as emulsifying agents for other fatty constituents such as triglyceride oils. At the separation station, the non-dispersed fatty constituents, which have an average specific gravity from about 0.89 to about 0.95, rise to the surface and are removed for further commercial processing. The aqueous phase from the separation station, which contains dispersed fatty constituents, has, heretofore, been discharged as waste water. Since this water frequently contains from 600 to 1,000 parts per million of fatty constituents, it constitutes a source of environmental pollution as well as an economic loss of processable oil.

PRIOR ART

It is disclosed in the prior art, U.S. Pat. No. 3,574,329 (Beavon, 1971), that fluid dispersions derived from petroleum and vegetable oil sources and containing water, oil and particulate solids can be resolved by filtering the fluid dispersion through a granular filter media, such as sand, having a particle size from about 0.1 to 5.0 mm. in average diameter at a rate from about 2 to about 10 gallons per minute per square foot of filter media surface area. The solids are retained by the filter media and the effluent therefrom consists of clarified water or a mixture of water and oil which readily separates into defined layers of clarified water and oil. The filter media is periodically regenerated by stripping oil therefrom with either steam or an organic solvent and thereafter backwashing with water at a rate from about 3 to about 15 gallons per minute per square foot of filter media surface area to remove oil-free entrained solids from the filter bed.

Although the filtration method disclosed in U.S. Pat. No. 3,574,329 for treating fluid dispersions containing oil, water and particulate solids to produce clarified water, solids-free oil and oil-free solids constitutes an improvement in the art, it has certain inherent drawbacks with respect to the step of regenerating the filter media. This step includes the use of either steam or an organic solvent for extracting and removing retained oil from the filter media. Steam, however, requires the use of high pressure equipment and ancillary safety valves, presents hazards in handling, increases processing costs and, in addition, calls for condensing and demulsifying treatment. Moreover, when the feed to the filter is oily waste water from vegetable processing sources, it has been found that the steam stripping step of the prior art does not remove unsaturated fatty oil constituents retained by the filter media but, instead, causes the unsaturated oils to polymerize and adhere to the media. The use of organic solvents to strip oil from the filter media adds substantially to processing costs since expensive recovery techniques are required to obtain reuseable solvent.

OBJECTS

Accordingly, an object of this invention is to provide an efficient and economical process for extracting and removing oil and particulate solids from the filter media and to provide an efficacious method for treating the resulting extraction to obtain solids-free oil and oil-free solids.

Another object of this invention is to provide an aqueous emulsion method for extracting and removing oil and particulate solids from the filter media and a thermal process for treating the resulting extraction to obtain solids-free oil, useable water and oil-free solids.

A further object of this invention is to provide an aqueous, nonionic emulsion method for extracting and removing oil and particulate solids from the filter media and a thermal process for treating the resulting extraction at a temperature above the cloud point of the nonionic to obtain mutualy exclusive fluid layers containing (a) solids-free oil, (b) useable water and (c) oil-free solids.

SUMMARY OF THE INVENTION

In accordance with this invention, the oil and particulate solids retained by the filter media from the filtration of oil-water-solids fluid dispersions are extracted and removed from the media by an aqueous emulsion method and thereafter resolved and separated by thermal treatment. Initially, the filter media containing oil and particulate solids is agitated in the presence of a first aqueous medium containing a nonionic surfactant for the oil. The agitation is carried out at a temperature below the cloud point of the nonionic surfactant to displace oil from the filter media and form an emulsion of the oil with the first aqueous medium. Upon completion of the agitation step, the filter media is backwashed with a second aqueous medium to remove the emulsion and particulate solids from the filter media and to obtain a backwashing composition containing the emulsion and particulate solids. Thereafter, the backwashing composition is heated to a temperature above the cloud point of the nonionic surfactant whereby the backwashing composition is resolved and separated into (a) a fluid layer containing solids-free oil, (b) a fluid layer containing useable water and (c) a fluid layer containing oil-free solids.

DETAILED DESCRIPTION

The oil-water-solids fluid dispersions which can be treated in accordance with the filtration method to obtain nonpolluting, clarified water are, typically, oily waste water systems obtained from various sources such as hydrocarbon oil and oxyhydrocarbon oil processing and refining streams as well as hydrocarbon oil use sources as, for example, rolling mill streams from steel mills and like processes containing lubricating or cutting oils.

The hydrocarbon oil content of the oily water fluid systems from petroleum processing and refining streams may vary from 15 parts per million to an amount in excess of 50 percent of the fluid system. The particulate solids in such systems may be earth residues, precipitates, salts, processing byproducts, bacterial, algial and fungal solids and other entrainments and are usually oil-wet. If this fluid system contains napthenics, phenolics, and/or sulfonic acid in soluble form, a non-toxic acidifying agent is added thereto in an amount to adjust the pH thereof below 4.8 to convert the water soluble organic material to a water insoluble, adsorbable oil.

The oily waste water from fatty oil processing and refining streams usually contain dispersions of fatty constituents and particulate solids which do not separate from the aqueous phase by gravity settling procedures. The fatty constituents present in the dispersed phase of this oily waste water may vary in amount from about 300 parts per million to about 1000 parts per million or more and include, for example, fatty acids, fatty oils, fats, and fatty glycerides in which the hydrocarbon chains have from about 14 to about 22 carbon atoms. If the pH of the oily waste water from the fatty oil processing and refining steps is in excess of 4.8, a non-toxic acidifying agent is advantageously added thereto to adjust the pH below 4.8 whereby the filter media more effectively extracts fatty constituents from the feed fluid.

The filter media used in the filtration of the fluid dispersions should be resistant to acid and alkaline environments and insoluble with respect to oil and water. Materials which can be used as the filter media include, for example, garnet, ground slag, silica sand, ground anthracite, aluminum oxide, volcanic tuff, oil shale, volcanic slag, ground brick, magnesium oxide, ground glass, ground incinerator residue and weighted organic polymers. In general, the filter media has a particle mesh size from about 3 to about 100 with the particular mesh size range, median size and distribution pattern being selected so as to most effectively and efficiently filter the feed fluid. The filter media may contain from 2 to about 8 cubic feet or filter material for each square foot of filter media surface area. A multiple layer filter media, wherein each layer has a particle mesh size range distinct from its adjoining layer, can be advantageously used to resolve the dispersions. Typically, such layers are built upon a porous support bed from fine to coarse layers in order to promote gradient filtration.

The rate of filtration of the fluid dispersion can vary from about 1 to about 50 gallons per minute per square foot of filter media surface area with the particular rate selected being a function of the composition of the feed fluid and the particle size distribution pattern of the filter media. During the filtration run, oil and particulate solids are extracted from the oil-water-soilds fluid dispersion and retained by the filter media.

At or prior to the time of saturation of the filter media with solids and oil as indicated by pressure increase and/or oil breakthrough, the flow of the fluid dispersion to the filter vessel is discontinued and free fluid is allowed to drain from the filter media. Positive air pressure may be applied to the filter vessel to accelerate draining. Upon completion of the drainage step, the filter media is regenerated by an emulsification process which includes removal and separation of retained constituents.

Initially, an aqueous medium containing a nonionic surfactant for the oil is added to the filter vessel in an amount corresponding to about 20 to about 30 percent of the volume of the filter media. The concentration of the nonionic surfactant in the aqueous medium is generally from about 0.1 to about 10.0 percent, by weight, based upon the weight of the aqueous medium, with an intermediate concentration range being from about 0.02 to 2.0 percent, by weight, and a preferred concentration range being from about 0.04 to 1.0 percent by weight.

The nonionic surfactants which are used in practicing the method of the invention should have a cloud point, under use conditions, below the boiling point of water in order to facilitate the separation of oil and solids which have been extracted and removed from the filter media, as will hereinafter be more fully described. However, nonionic surfactants having a cloud point above the boiling point of water can be used in the method of this invention provided that the addition of inorganic water soluble salts such as sodium chloride to the aqueous medium in amount up to 10 percent of the weight of the aqueous medium is sufficient to reduce the cloud point of the surfactants to below the boiling point of water. The minimum cloud point of the nonionic surfactant should be above ambient temperatures which prevail in the filter vessel in order for the surfactant to effectively extract oil from the filter media. Generally, the nonionic surfactant will have a cloud point, under conditions of use in the method of this invention, between about 100° F. and 212° F. In a preferred aspect of this invention, nonionic surfactants are employed which have a cloud point, under conditions of use, between about 140° F. and 180° F.

The nonionic surfactants advantageously have calculated HLB values from about 7 to about 30, with good results being attained within the range from about 10 to about 17 and superior results being attained when the HLB values are between about 13 and about 15.

Nonionic surfactants which are useful in the present invention include:

(a) ethoxylated fatty alkyl alcohols,
(b) ethoxylated mono- or dialkyl phenols,
(c) ethoxylated polyoxypropylene addition products of propylene glycol,
(d) ethoxylated polyoxypropylene addition products of ethylene diamine, and
(e) propoxylated polyoxyethylene addition products of ethylene glycol.

The ethoxylated fatty alkyl alcohols generally have from about 11 to about 15 carbon atoms in the hydrophobic alkyl group and from about 7 to about 15 moles of ethylene oxide in the hydrophilic polyoxyethylene chain. Examples of nonionic surfactants in this category include the addition product of tridecyl alcohol with 13 moles of ethylene oxide and the addition product of tridecyl alcohol with 11 moles of ethylene oxide.

The ethoxylated monalkyl phenols generally have from about 8 to about 12 carbon atoms in the alkyl group and from about 6 to about 50 moles of ethylene oxide in the polyoxyethylene hydrophilic chain, with improved results being attained when the polyoxyethylene chain contains from about 8 to about 30 moles of ethylene oxide, and optimum results being attained when the polyoxyethylene chain contains from about 9 to about 15 moles of ethylene oxide. The ethoxylated dialkyl phenols have from about 8 to about 12 carbon atoms in each alkyl group and have a broad, intermediate and preferred polyoxyethylene content corresponding to that set forth for the ethoxylated monalkyl phenols. Specific examples of nonionic surfactants in this category are set forth in the following table:

TABLE I

| Proprietary name | Alkyl phenol | Moles ethylene oxide | HLB | Cloud pt 1% aq soln., 0° C |
|---|---|---|---|---|
| Igepal CO 630 | Octyl phenol | 9 | | |
| Emnon 6963 | Nonyl phenol | 7-8 | 12.3 | 20 |
| Emnon 6964 | do | 9-10 | 12.9 | 52-56 |
| Emnon 6932 | do | 10 | 13.5 | 60-65 |
| Emnon 6965 | do | 11 | 13.5 | 69-74 |
| Emery 15351 | do | 12 | 14.1 | *50-54 |
| Emery 15366 | do | 13 | 14.5 | 88-93 |
| Emery 15458 | do | 15 | 15.1 | *64-67 |
| Igepal CO 850 | do | 20 | | |
| Emnon 6968 | do | 30 | 17.1 | *75-80 |
| Igepal DM 710 | Dinonyl phenol | 10-11 | | |
| Igepal DM 970 | do | 50 | | |
| NIO | Duodecyl phenol | 6 | | |
| NIW | do | 14 | | |

*10% NaCl solution.

The ethoxylated polyoxypropylene adducts of propylene glycol generally have a molecular weight from about 1,600 to about 14,000 and the polyoxyethylene portion constitutes from about 20 to about 80 percent, by weight, of the final molecule. Preferably, the molecular weight of these surfactants is from about 2,500 to about 7,000 and the polyoxyethylene portion constitutes from about 30 to about 50 percent, by weight of the final molecule. Specific examples of nonionic surfactants in this category of ethylene oxide/propylene oxide block copolymers are set forth in the following table.

TABLE II

| Proprietary name | Avg. mol. wt. | Mol. wt. of polyoxypropylene hydrophobe | Percent polyoxyethylene in total molecule | HLB |
|---|---|---|---|---|
| Pluronic L 42 | 1,630 | 1,200 | 20 | 8 |
| Pluronic L 43 | 1,850 | 1,200 | 30 | 12 |
| Pluronic L 44 | 2,200 | 1,200 | 40 | 16 |
| Pluronic L 63 | 2,650 | 1,750 | 30 | 11 |
| Pluronic L 64 | 2,900 | 1,750 | 40 | 15 |
| Pluronic P 65 | 3,400 | 1,750 | 50 | 17 |
| Pluronic P 75 | 4,150 | 2,050 | 50 | 16.5 |
| Pluronic P 84 | 4,200 | 2,250 | 40 | 14 |
| Pluronic P 85 | 4,600 | 2,250 | 50 | 16 |
| Pluronic P 94 | 4,600 | 2,750 | 40 | 13.5 |
| Pluronic P 103 | 4,950 | 3,250 | 30 | 9 |
| Pluronic P 104 | 5,850 | 3,250 | 40 | 13 |
| Pluronic P 105 | 6,500 | 3,250 | 50 | 15 |
| Pluronic P 123 | 5,750 | 4,000 | 30 | 8 |
| Pluronic F 68 | 8,350 | 1,750 | 80 | 29 |
| Pluronic F 77 | 6,600 | 2,050 | 70 | 24.5 |
| Pluronic F 87 | 7,700 | 2,250 | 70 | 24 |
| Pluronic F 88 | 10,800 | 2,250 | 80 | 28 |
| Pluronic F 98 | 13,500 | 2,750 | 80 | 27.5 |
| Pluronic F 108 | 14,000 | 3,250 | 80 | 27 |
| Pluronic F 127 | 12,500 | 4,000 | 70 | 22 |

The ethoxylated polyoxypropylene adducts of ethylenediamine generally have a molecular weight from about 4,000 to about 19,000 and the polyoxyethylene portion constitutes from about 20 to about 80 percent, by weight, of the final molecule. Specific examples of nonionic surfactants in this category of block copolymers are set forth in the following table.

TABLE III

| Proprietary name | Avg. mol. wt. | Avg. mol. wt. of polyoxypropylene hydrophobe | Percent polyoxyethylene in total molecule | Cloud pt. 1% aq. soln., 0° C. | HLB |
|---|---|---|---|---|---|
| Tetronic 504 | 3,400 | 1,750 | 40 | 68 | 15.5 |
| Tetronic 702 | 4,000 | 2,750 | 20 | 27 | 7 |
| Tetronic 704 | 5,500 | 2,750 | 40 | 65 | 15 |
| Tetronic 707 | 12,000 | 2,750 | 70 | >100 | 27 |
| Tetronic 904 | 7,500 | 3,750 | 40 | 64 | 14.5 |
| Tetronic 1104 | 8,300 | 4,750 | 40 | 72 | 14 |
| Tetronic 1107 | 14,500 | 4,750 | 70 | >100 | 24 |
| Tetronic 1304 | 10,500 | 5,750 | 40 | 78 | 13.5 |
| Tetronic 1504 | 12,500 | 6,750 | 40 | 90 | 13 |

The propoxylated polyoxyethylene adducts of ethylene glycol generally have a molecular weight from about 2,000 to about 9,000 and the polyoxyethylene portion constitutes from about 20 to about 80 percent, by weight, of the final molecule. Examples of nonionic surfactants in this category of block copolymers are set forth in the following table.

TABLE IV

| Proprietary name | Avg. mol. wt. | Avg. mol. wt. of polyoxypropylene hydrophobe | Percent polyoxyethylene in total molecule | Cloud pt. 1% aq. soln., 0° C. |
|---|---|---|---|---|
| Pluronic 10R5 | 1,970 | 1,000 | 50 | 69 |
| Pluronic 10R8 | 5,000 | 1,000 | 80 | 99 |
| Pluronic 17R2 | 2,100 | 1,700 | 20 | 39 |
| Pluronic 17R4 | 2,700 | 1,700 | 40 | 47 |
| Pluronic 17R8 | 7,500 | 1,700 | 80 | 81 |
| Pluronic 25R2 | 3,120 | 2,500 | 20 | 33 |
| Pluronic 25R4 | 3,800 | 2,500 | 40 | 40 |
| Pluronic 25R5 | 4,500 | 2,500 | 50 | 44 |
| Pluronic 25R8 | 9,000 | 2,500 | 80 | 80 |

Following the addition of the surfactant solution to the saturated or partially saturated filter media, the media is agitated in the presence of the surfactant solution to extract oil from the media and form an oil-water emulsion. Any suitable means can be used to agitate the filter media. In a preferred embodiment, agitation is brought about by introducing air into the bottom of the filter media at a pressure from about 3 to 6 p.s.i.g. for about 2 to about 5 minutes or more.

Upon completion of the agitation step, the filter media is backwashed with fresh water in a direction countercurrent to the flow of the oily water feed fluid at a rate from about 12 to about 20 gallons per minute per square foot of filter media surface area and, preferably, at a rate from about 15 to 18 gallons per minute per square foot of filter media surface area to remove the emulsion and particulate solids from the filter media and to obtain a backwashing composition of the same. After backwashing the filter bed is ready for reuse.

The backwashing composition is conveyed to a three-phase separator where the fluid composition is heated to a temperature above the cloud point of the nonionic surfactant which, as hereinabove described, is below the boiling point of water. As a result of this heating step, the backwashing composition is resolved into (a) an upper fluid layer containing solids-free oil, (b) a middle fluid layer containing useable water and a lower fluid layer containing oil-free solids.

The solids-free oil is returned to the principal oil processing unit for further commercial processing; the useable water may be used to prepare surfactant solutions for regenerating the filter media; and the oil-free solids may be separated from water and pit buried or used as land fill or disposed of by other conventional means.

Since the sequence of filtration and filter media regeneration can be repeated indefinitely, and since it is desirable to operate the filtration system continuously, it is preferred, therefore, to operate two or more filters in parallel with one or more filter being used ot filter the oily waste water while one or more filters are being regenerated.

EXAMPLES

The following examples further illustrate the invention.

EXAMPLE I

To a 60 gallon filter vessel, there was added 1 cubic foot of 8 mesh garnet as a support base and, as filter media, there was sequentially added thereto 3 cubic feet of 20 to 80 mesh ground glass and 2 cubic feet of 2 mesh anthracite. A refinery slop oil emulsion containing 300 parts per million of oil and 600 parts per million of insoluble particulate solids was filtered through the media at a rate equivalent to 20 gallons per minute per square foot of filter media surface area for 2 hours and 15 minutes. The effluent from the filter media contained 53 parts per million of oil and 10 parts per million of solids. At the end of the run, the inlet line was closed and positive air pressure was applied to the filter vessel to facilitate drainage of free fluids. Upon completion of the pressurization step, the outlet line was closed.

0.2 pound of EMNON 6965 nonionic surfactant (ethoxylated nonyl phenol containing 11 moles of ethylene oxide) was added to 100 pounds of water and the resulting surfactant solution containing 0.2%, by weight, of surfactant based upon the weight of water was added to the filter vessel. Pressurized air was introduced into the bottom of the filter vessel and the filter media was agitated in the presence of the surfactant solution for 3 minutes to extract oil from media and form an oil-water emulsion. Upon completion of the agitation step, the filter media was backwashed with 70 gallons of water to remove the emulsion and particulate solids from the filter media and to obtain a backwashing composition containing the same. The resulting backwashing composition was conveyed to a three-phase separator where it was heated from ambient temperature to 180° F. at which point the backwashing composition was resolved into (a) an upper fluid layer containing solids-free oil with less than 1% water, (b) a middle fluid layer containing useable water with 75 parts per million of oil and (c) a lower fluid layer containing oil-free solids.

EXAMPLE II

To a filter vessel 1 inch in diameter, there was added 1 inch of 8 mesh garnet as a support base and 6 inches of 20 to 80 mesh ground glass as filter media. One liter of an oil-water-solids fluid dispersion containing 20,000 p.p.m. of crude oil and 600 p.p.m. of insoluble particulate solids was filtered through the media at a flow rate of 0.25 liter per minute. Oil and solids were retained by the filter media. The effluent contained 20 p.p.m. of oil and no solids. Pressurized air was employed to facilitate drainage of residual water in the media.

0.13 gram of EMNON 6963 nonionic surfactant (ethoxylated nonyl phenol containing 7–8 moles of ethylene oxide) was added to 65 grams of water and the resulting surfactant solution was added to the filter vessel. Pressurized air was introduced into the bottom of the filter vessel and the filter media was agitated for 5 minutes in the presence of the surfactant solution to extract oil from the media and form an oil/water emulsion. The resulting fluid, comprising emulsion and solids, was removed from the filter vessel and transferred to another vessel where it was heated from ambient temperature to 150° F. at which point solids separated from the fluid and flocculated to the bottom of the vessel. Heating was continued to 190° F. at which point oil and water separated into distinct layers.

EXAMPLE III

One liter of an oil-water-solids dispersion containing 20,000 p.p.m. of crude oil and 600 p.p.m. of particulate solids was filtered through the filter media described in Example II under the conditions therein specified to separate and retain oil and solids from the feed fluid. 0.065 gram of EMNON 6962 nonionic surfactant (ethoxylated nonyl phenol containing 6 moles of ethylene oxide) was added to 65 grams of water and the resulting surfactant solution was added to the filter vessel. The filter media was agitated in accordance with the procedure set forth in Example II to extract oil from the media and form an oil-water emulsion. The resulting fluid, comprising emulsion and solids, was removed from the filter vessel and transferred to another vessel where it was heated from ambient temperature to 130° F. at which point solids separated from the fluid and flocculated to the bottom of the vessel. Heating was continued to 165° F. at which point oil and water separated into distinct layers.

EXAMPLE IV

To the filter media described in Example II having, as retained constituents, crude oil and particulate solids from the filtration of one liter of an oil-water-solids dispersion containing 20,000 p.p.m. of crude oil and 600 p.p.m. of solids, there was added the surfactant solution prepared by adding 0.13 gram of EMERY 15458 nonionic surfactant (ethoxylated nonyl phenol containing 15 moles of ethylene oxide) to 65 grams of water. The filter media was agitated in accordance with the procedure set forth in Example II and the resulting fluid, comprising emulsion and solids, was removed from media and heated. At 95° F. solids began to flocculate and at 155° F. oil and water separated into distinct layers.

EXAMPLE V

A filter media as described in Example II and having, as retained constituents, fatty oil and particulate solids from the filtration of one liter of a fatty oil-water-solids dispersion is agitated by pressurized air in the presence of a surfactant solution prepared by adding 0.065 gram of EMERY 15458 nonionic surfactant (ethoxylated nonyl phenol containing 15 moles of ethylene oxide) and 6.5 grams of sodium chloride to 65 grams of water. The resulting fluid, comprising emulsion and solids, is removed from the media and heated to 160° F. at which point the fatty oil and and water separate into distinct layers and the solids flocculate.

EXAMPLE VI

A filter media as described in Example II and having, as retained constituents, fatty oil and nominal solids from the filtration of one liter of a fatty oil-water dispersion is agitated by pressurized air in the presence of a surfactant solution prepared by adding 0.065 gram of EMERY 6953 nonionic surfactant (ethoxylated tridecyl alcohol containing 13 moles of ethylene oxide) to 65 grams of water. The resulting emulsion is removed from the media and heated to 185° F. at which point fatty oil separates into an oil layer.

I claim:

1. In the filtration method for resolving fluid dispersions containing oil, water and particulate solids, wherein the fluid dispersion is filtered through a finely divided filter media whereby oil and particulate solids are retained by the filter media and the effluent therefrom is clarified water or an oil-water mixture which readily separates into oil and clarified water, the improvement which comprises extracting and removing the oil and particulate solids from the filter media and separating the same by the following sequential steps:

(a) agitating the filter media in the presence of a first aqueous medium containing a nonionic surfactant for the oil to extract the oil from the filter media and form an emulsion of the oil with the first aqueous medium, said agitation being carried out at a temperature below the cloud point of the nonionic surfactant, said nonionic surfactant having an HLB value between about 7 and about 30, and the concentration of said nonionic surfactant in the first aqueous medium being from about 0.01 to about 10.0 percent, by weight, based on the weight of said first aqueous medium, and said nonionic surfactant having a cloud point, under use conditions, below the boiling point of water, (b) backwashing the filter media with a second aqueous medium to remove the emulsion and particulate solids from the filter media and to obtain a backwashing composition containing the emulsion and particulate solids; and (c) heating the backwashing composition to a temperature above the cloud point of the nonionic surfactant whereby said backwashing composition is resolved into (a) an upper layer containing solids-free oil, (b) a middle fluid layer containing useable water and (c) a lower fluid layer containing oil-free solids.

2. A method according to Claim 1 wherein the concentration of the nonionc surfactant in the first aqueous medium is from about 0.02 to about 2.0 percent, by weight, based on the weight of the first aqueous medium.

3. A method according to Claim 1 wherein the concentration of the nonionic surfactant in the first aqueous medium is from about 0.04 to 1.0 percent, by weight, based on the weight of the first aqueous medium.

4. A method according to Claim 1 wherein the nonionic surfactant has a cloud point, under use conditions, between about 140° F. and about 180° F.

5. A method according to Claim 1 wherein the nonionic surfactant has an HLB value between about 10 and about 17.

6. A method according to Claim 1 wherein the nonionic surfactant has an HLB value between about 13 and about 15.

7. A method according to Claim 1 wherein the nonionic surfactant is a member selected from the group consisting of ethoxylated fatty alkyl alcohols, ethoxylated alkyl phenols, ethoxylated polyoxypropylene adducts of propylene glycol, ethoxylated polyoxypropylene adducts of ethylene diamine, and propoxylated polyoxyethylene adducts of ethylene glycol.

8. A method according to Claim 1 wherein the nonionic surfactant is ethoxylated monoalkyl phenol having from about 8 to about 12 carbon atoms in the alkyl group and containing from about 6 to about 50 moles of ethylene oxide per mole of alkylated phenol.

9. A method according to Claim 8 wherein the ethoxylated monoalkyl phenol contains from about 8 to about 30 moles of ethylene oxide per mole of alkylated phenol.

10. A method according to Claim 8 wherein the ethoxylated monoalkyl phenol contains from about 9 to about 15 moles of ethylene oxide per mole of alkylated phenol.

11. A method according to Claim 1 wherein the nonionic surfactant is nonyl phenol containing from about 9 to about 15 moles of ethylene oxide per mole of nonyl phenol.

12. A method according to Claim 1 wherein the nonionic surfactant is ethoxylated dialkyl phenol having from about 8 to about 12 carbon atoms in each alkyl group and containing from about 6 to about 50 moles of ethylene oxide per mole of alkylated phenol.

References Cited

UNITED STATES PATENTS

| | | | |
|---|---|---|---|
| 3,574,329 | 4/1971 | Beavon | 210—80 |
| 3,756,959 | 9/1973 | Vitalis et al. | 252—334 |
| 3,645,952 | 2/1972 | Lindemann et al. | 260—29.6 T |
| 3,578,618 | 5/1971 | Beardsley | 260—17 |
| 3,484,370 | 12/1969 | Simon | 210—23 |

SAMIH N. ZAHARNA, Primary Examiner

B. CASTEL, Assistant Examiner

U.S. Cl. X.R.

210—35, 80